United States Patent
Kim (10) Patent No.: US 8,387,769 B2
(45) Date of Patent: Mar. 5, 2013

(54) PARKING APPARATUS FOR AUTOMATIC TRANSMISSION

(75) Inventor: Wooyeol Kim, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 139 days.

(21) Appl. No.: 13/174,674

(22) Filed: Jun. 30, 2011

(65) Prior Publication Data

US 2012/0103752 A1    May 3, 2012

(30) Foreign Application Priority Data

Nov. 3, 2010   (KR) .................. 10-2010-0108589

(51) Int. Cl.
*B60T 1/06* (2006.01)
*F16H 63/34* (2006.01)

(52) U.S. Cl. ........ 192/219.5; 188/31; 188/69; 74/411.5; 74/577 S (58) Field of Classification Search ................ 192/219.5
See application file for complete search history.

(56) References Cited

U.S. PATENT DOCUMENTS

| | | | |
|---|---|---|---|
| 4,120,383 A | * | 10/1978 | Kawamoto ....................... 188/31 |
| 4,610,336 A | * | 9/1986 | Kuwayama et al. ......... 192/219.5 |
| 5,964,335 A | | 10/1999 | Taniguchi et al. |
| 7,364,027 B2 | * | 4/2008 | Matsubara et al. ......... 192/219.5 |
| 2007/0158161 A1 | * | 7/2007 | Fujimoto et al. .......... 192/219.4 |

FOREIGN PATENT DOCUMENTS

| | | |
|---|---|---|
| JP | 11-37291 A | 2/1999 |
| KR | 10-0400709 B1 | 12/2003 |
| KR | 10-0747038 B1 | 8/2007 |
| KR | 10-0916427 B1 | 9/2009 |
| WO | WO 9725231 A1 | 7/1997 |

* cited by examiner

*Primary Examiner* — Richard M. Lorence
(74) *Attorney, Agent, or Firm* — Morgan, Lewis & Bockius LLP (57) ABSTRACT

A parking apparatus for an automatic transmission, may include a sprag shaft having a first portion and a second portion extending from the first portion, wherein an end of the first portion may be inserted in a shaft groove formed in a transmission housing, and a sprag having one end fitted around the first portion of the sprag shaft to rotate about the sprag shaft, a sprag bracket fitted around the first portion of the sprag shall to cover the end of the sprag therein, wherein the second portion protrudes through the sprag bracket and the sprag bracket may be fixed to the transmission housing, and a sprag return spring mounted on the second portion protruding through the sprag bracket, wherein an end of the sprag return spring may be supported by the transmission housing and the other end thereof may be supported by the sprag.

6 Claims, 7 Drawing Sheets

PARKING APPARATUS FOR AUTOMATIC TRANSMISSION

CROSS-REFERENCE TO RELATED APPLICATIONS

The present application claims priority to Korean Patent Application Number 10-2010-0108589 filed Nov. 3, 2010, the entire contents of which application is incorporated herein for all purposes by this reference.

BACKGROUND OF THE INVENTION

1. Field of the Invention

The present invention relates to a parking apparatus for an automatic transmission, and more particularly, to a parking apparatus for an automatic transmission for the installation structure of a sprag shaft and a sprag return spring.

2. Description of Related Art

In general, automatic transmissions are equipped with a parking apparatus that keeps a vehicle stopped by locking a parking gear on an output shaft in a P-range (parking range) with a sprag.

In the parking apparatus, a parking rod operates the sprag when a select lever is moved to the P-range, and the sprag is inserted in a concave-convexo portion on the outer circumferential of the parking gear, thereby locking the parking apparatus.

Figure 1:
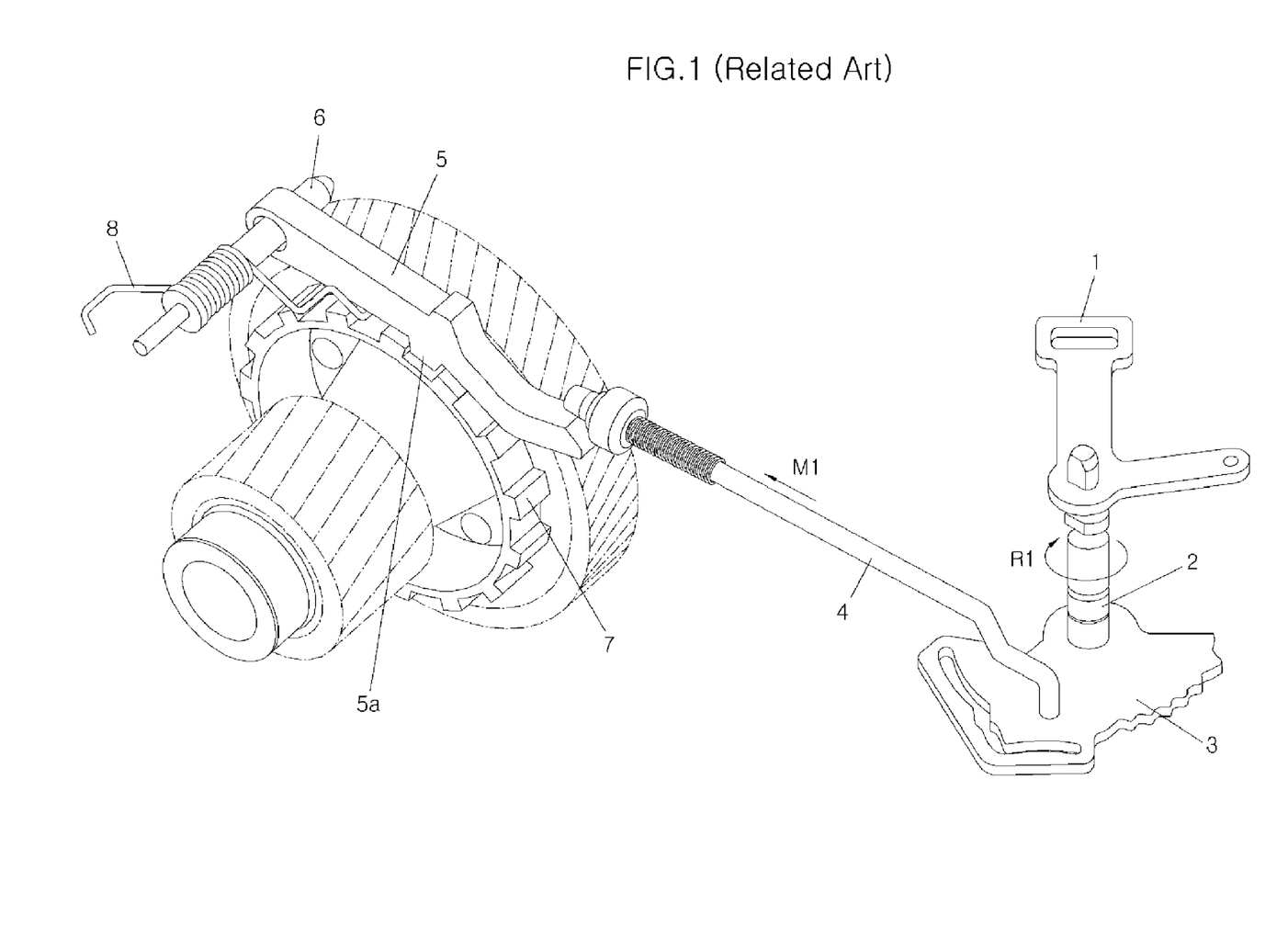
FIG. 1 is a perspective view of a parking apparatus of the related art.
Figure 2:
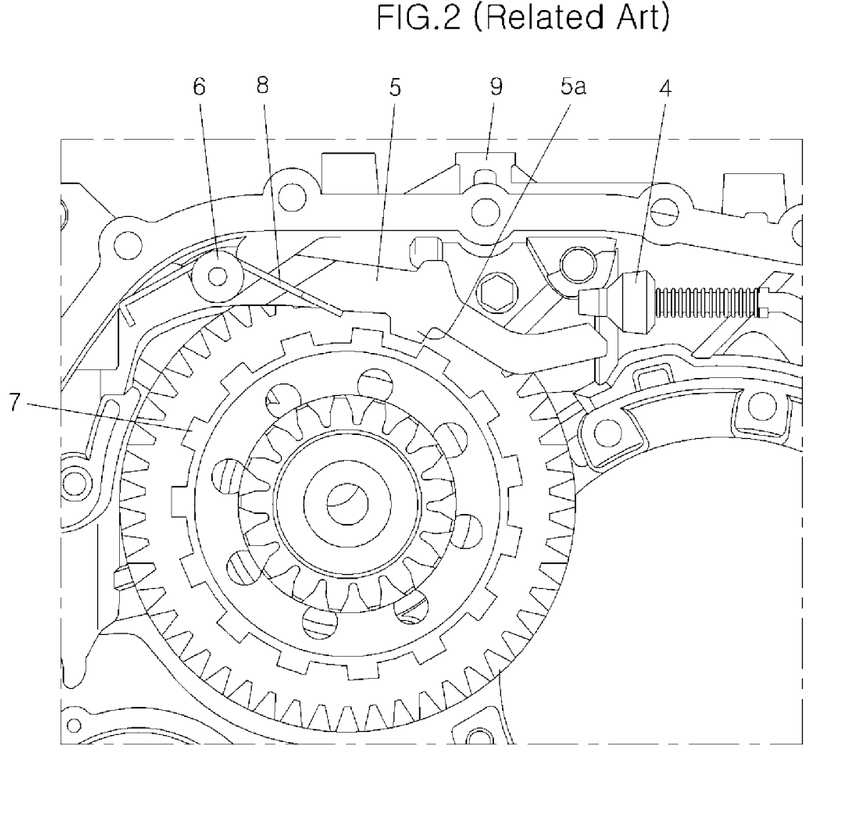
FIG. 2 is a front view showing when the parking apparatus of the related art is mounted in a transmission housing.
Figure 3:
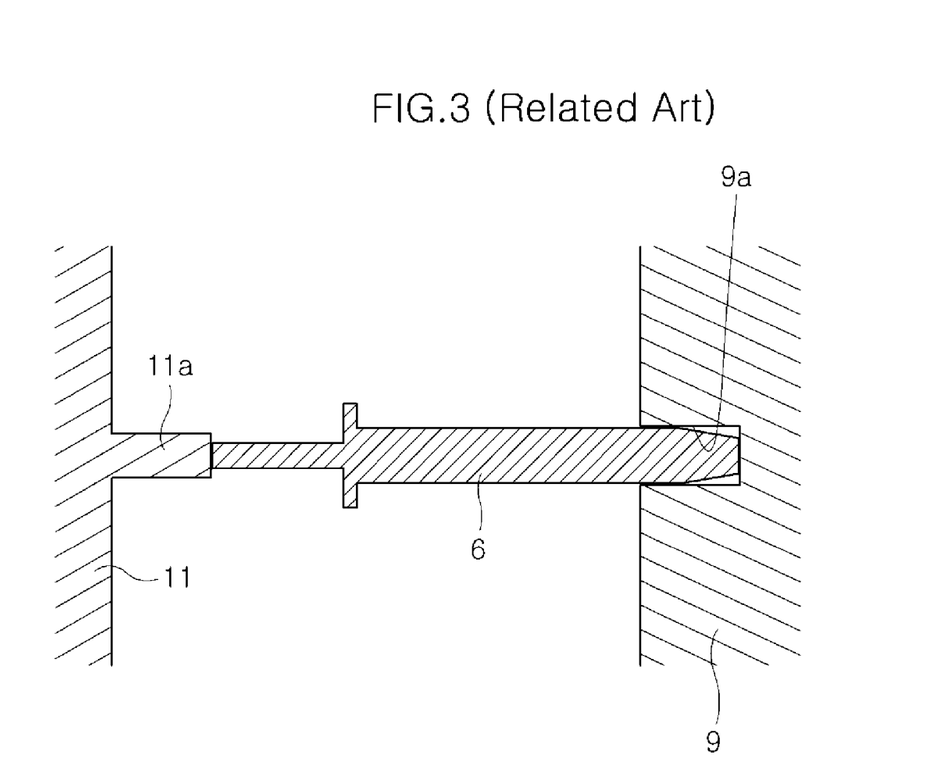
FIG. 3 is a schematic cross-sectional view showing the mounting structure of a sprag shaft in the parking apparatus of the related art.

That is, as shown in FIGS. 1 to 3, as the select lever (not shown) in a vehicle is moved to the P-range, a control lever 1, a select shaft 2, and a detent lever 3 integrally rotate in the direction of an arrow R1 and push a parking rod 4 in the direction of an arrow M1, such that the end of parking rod 4 comes in contact with a sprag 5.

One end of sprag 5 is rotatably fitted on a sprag shaft 6, such that as parking rod 4 comes in contact with sprag 5, sprag 5 rotates (clockwise in the figures) about sprag shaft 6, and accordingly, a sprag protrusion 5a of sprag 5 is inserted in a gear groove of a parking gear 7, thereby locking the parking apparatus.

A sprag return spring 8 is wound on sprag shaft 6, in which one end of sprag return spring 8 is supported by sprag 5 and the other end is supported by a transmission housing 9, such that sprag return spring 8 provides elastic return force to sprag 5, when sprag 5 rotates.

In the parking apparatus having the configuration described above, one end of sprag shaft 6 is inserted in a shaft groove 9a at transmission housing 9 and the other end is in contact with a housing protrusion 11a at a converter housing 11, such that sprag shaft 6 does not axially come out.

That is, housing protrusion 11a of converter housing 11 is in contact with the other end of sprag shaft 6 when transmission housing 9 and converter housing 11 are combined, such that sprag shaft 6 does not axially come out.

However, in the structure of the related art in which sprag shaft 6 is mounted held by housing protrusion 11a of converter housing 11, it is very inconvenient and difficult to form housing protrusion 11a on converter housing 11 and adjust the length of housing protrusion 11a to fit to the length of sprag shaft 6, such that convenience of work decreases and a large amount of working time is needed, and thus, productivity decreases.

In particular, when the position or the depth of shaft groove 9a of transmission housing 9 changes in accordance with the types of transmissions, the position and length of housing protrusion 11a should be correspondingly changed. In this case, it is difficult to freely design, because it needs to consider the problem in ensuring a space for forming housing protrusion 11a and the problem of interference with other parts should be considered.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to provide a parking apparatus for an automatic transmission that makes it possible to remove work and time for forming a housing protrusion by fixing a sprag shaft inserted in a shaft groove of a transmission housing, not using the housing protrusion, but using a specific assembly device, and accordingly, can improve convenience of work and productivity and reduce the cost because it can be generally used for all other types of transmissions.

In an aspect of the present invention, the parking apparatus for an automatic transmission, may include a sprag shaft having a first portion and a second portion extending from the first portion, wherein an end of the first portion may be inserted in a shaft groove formed in a transmission housing, and a sprag having one end fitted around the first portion of the sprag shaft to rotate about the sprag shaft, a sprag bracket fitted around the first portion of the sprag shaft to cover the end of the sprag therein, wherein the second portion protrudes through the sprag bracket and the sprag bracket may be fixed to the transmission housing, and a sprag return spring mounted on the second portion protruding through the sprag bracket, wherein an end of the sprag return spring may be supported by the transmission housing and the other end thereof may be supported by the sprag.

The first portion of the sprag shaft may have a diameter larger than a diameter at the second portion thereof, and a locking step substantially perpendicular to a longitudinal axis of the sprag shaft may be formed at an interface of the first and second portions of the sprag shaft.

The parking apparatus may further include a stopper plate that may be fitted on the first portion of the sprag shaft in close contact to a front surface of the sprag bracket, may be fixed to the sprag bracket when the sprag bracket may be fixed to the transmission housing, so as to prevent the sprag shaft from being decoupled from the transmission housing by coming in contact with the locking step when the sprag shaft moved to come out from the shaft groove.

The parking apparatus may further include a fixing clip that may be fixed on the second portion of the sprag shaft with a predetermined distance from the stopper plate along the longitudinal axis of the sprag shaft so as to prevent the sprag return spring from being decoupled from the sprag shaft.

The sprag return spring may be positioned on the second portion of the sprag shaft between the stopper plate and the fixing clip.

A plurality of fastening members may be fastened to the transmission housing, through the stopper plate and the sprag bracket.

According to the exemplary embodiments of the present invention, it is possible to easily mount a sprag shaft by holding the sprag shaft with a sprag bracket and a stopper plate, improve productivity by decreasing the work time, reduce the cost by being commonly used for all other types of transmissions, and remove the problems due to interference with other parts, thereby achieving free design.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

Figure 4:
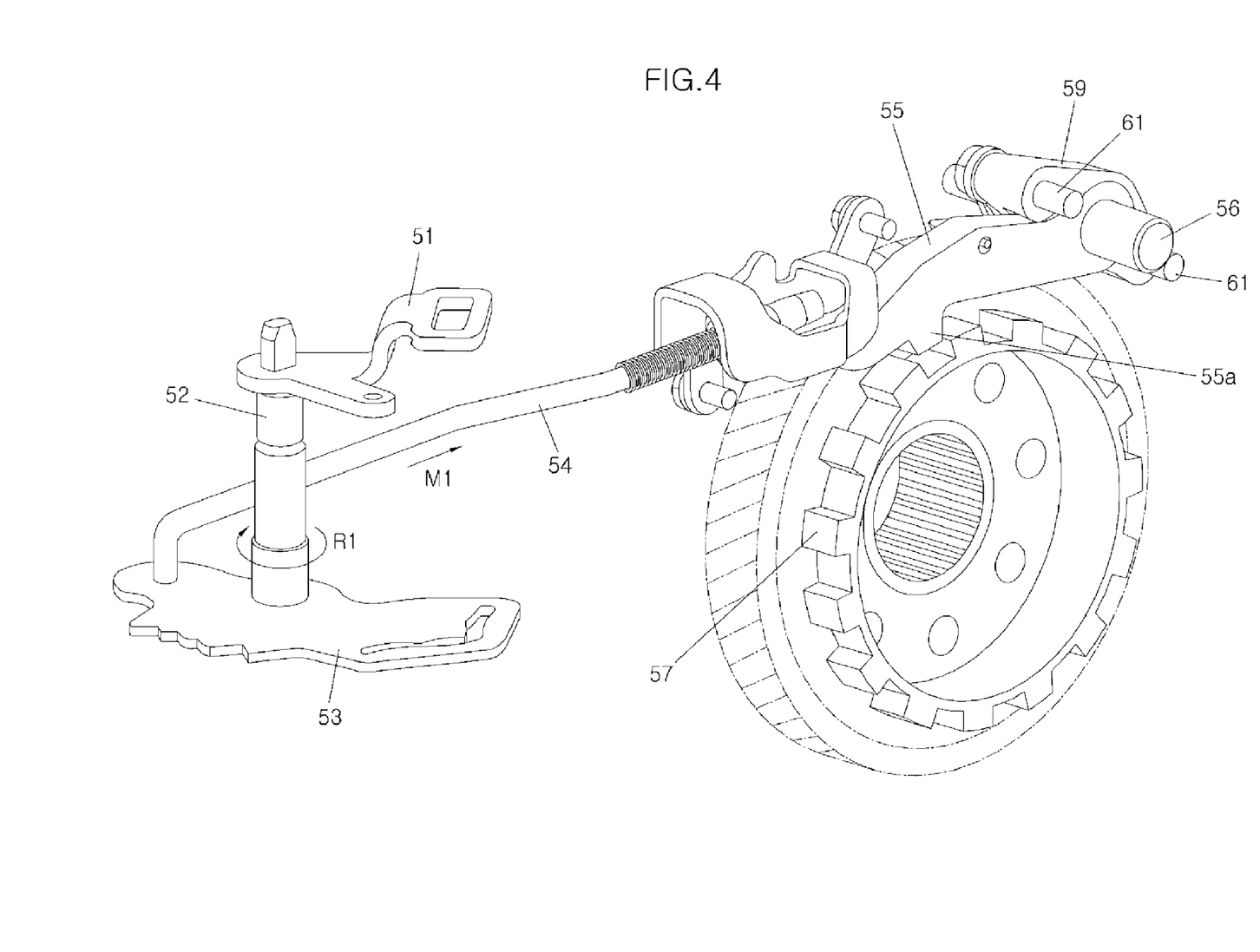
FIG. 4 is a perspective view of a parking apparatus according to an exemplary embodiment of the present invention.
Figure 5:
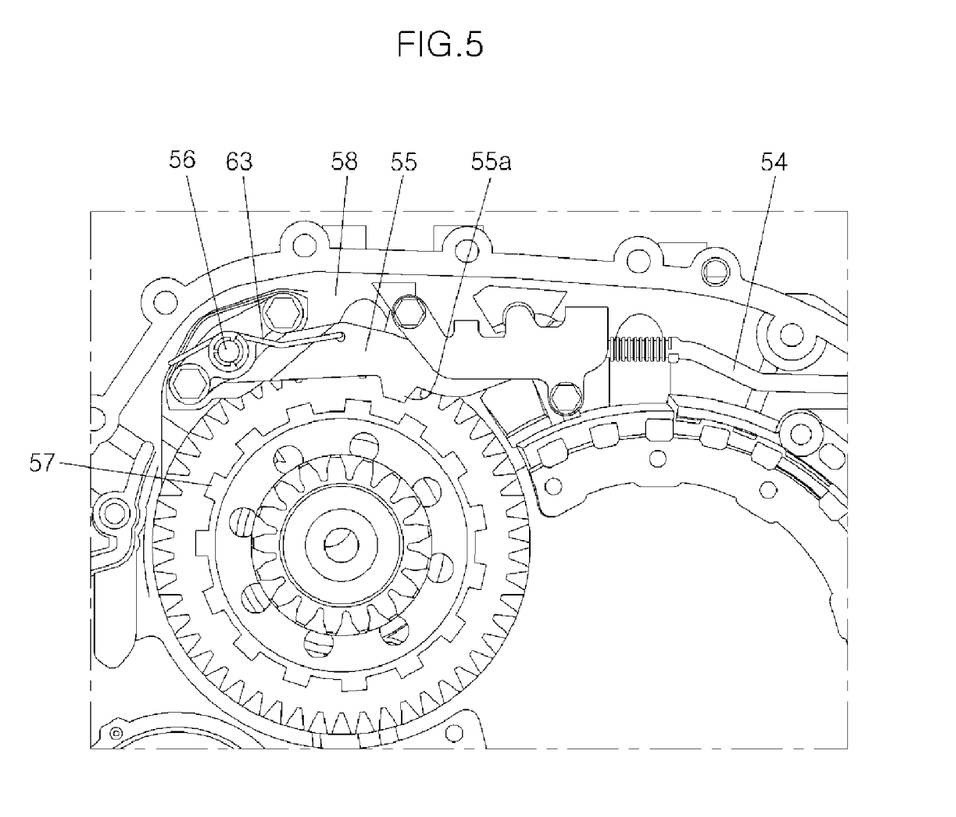
FIG. 5 is a front view showing when the parking apparatus according to the exemplary embodiment of the present invention is mounted in a transmission housing.

In a parking apparatus for an automatic transmission according to the exemplary embodiments of the present invention, as shown in FIGS. 4 to 7, a control lever 51 that rotates with operation of a select lever in a vehicle is integrally coupled to one end of a select shaft 52 and a detent lever 53 is integrally coupled to the other end of select shaft 52, such that as the select lever is moved to a P-range, control lever 51, select shaft 52, and detent lever 53 simultaneously rotate in the direction of an arrow R1 shown in FIG. 4.

One end of a parking rod 54 is coupled to detent lever 53 and the other end of parking rod 54 is arranged to a sprag 55 while one end of sprag 55 is fitted on a sprag shaft 56 to be able to rotate about sprag shaft 56.

A sprag protrusion 55*a* protrudes from the bottom of sprag 55 and a parking gear 57 fitted on an output shaft is disposed under sprag protrusion 55*a*. Accordingly, as parking rod 54 move in the direction of an arrow M1 and comes in contact with sprag 55 by rotation of detent lever 53, sprag 55 rotates about sprag shaft 56 (counterclockwise in FIG. 4) and sprag protrusion 55*a* of sprag 55 is correspondingly inserted in a gear groove of parking gear 57, such that the apparatus is locked.

Sprag shall 56 has one end inserted in a shaft groove 58*a* of a transmission housing 58 through one end of sprag 55 and the other end protruding in transmission housing 58.

Figure 6:
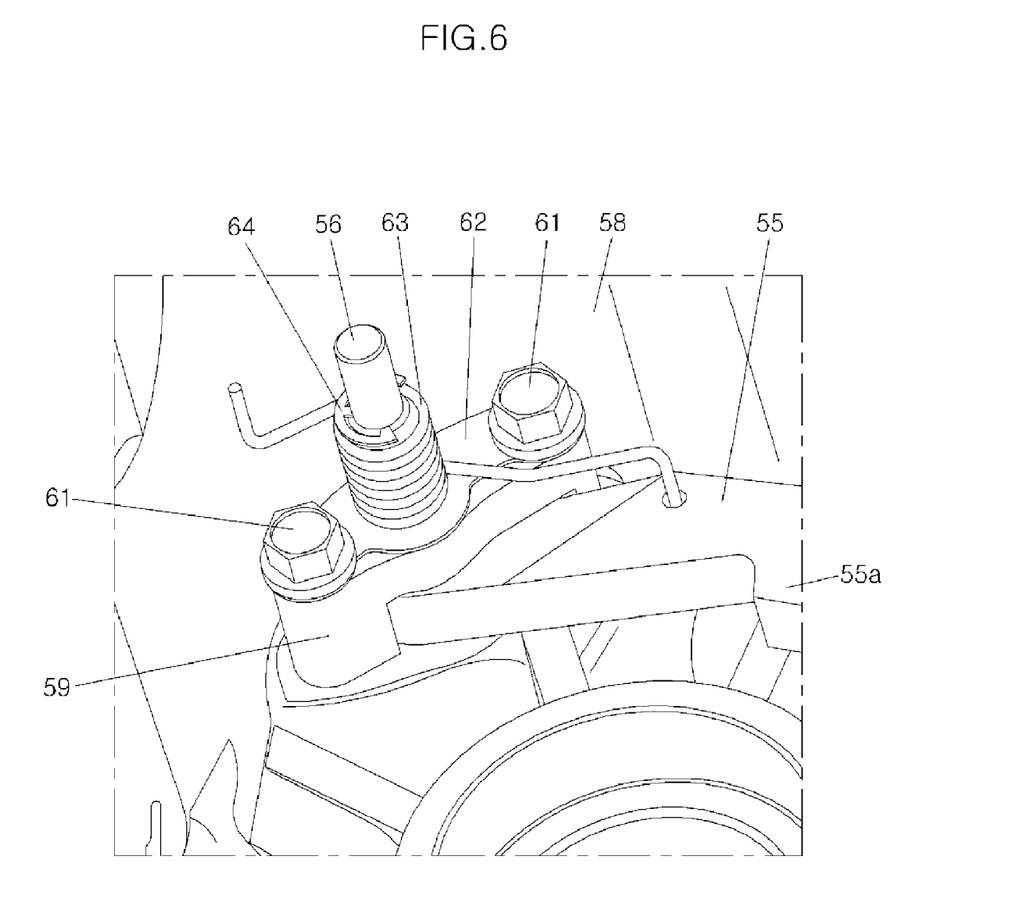
FIG. 6 is a perspective view showing the portion where a sprag shaft is mounted in the parking apparatus according to the exemplary embodiment of the present invention.
Figure 7:
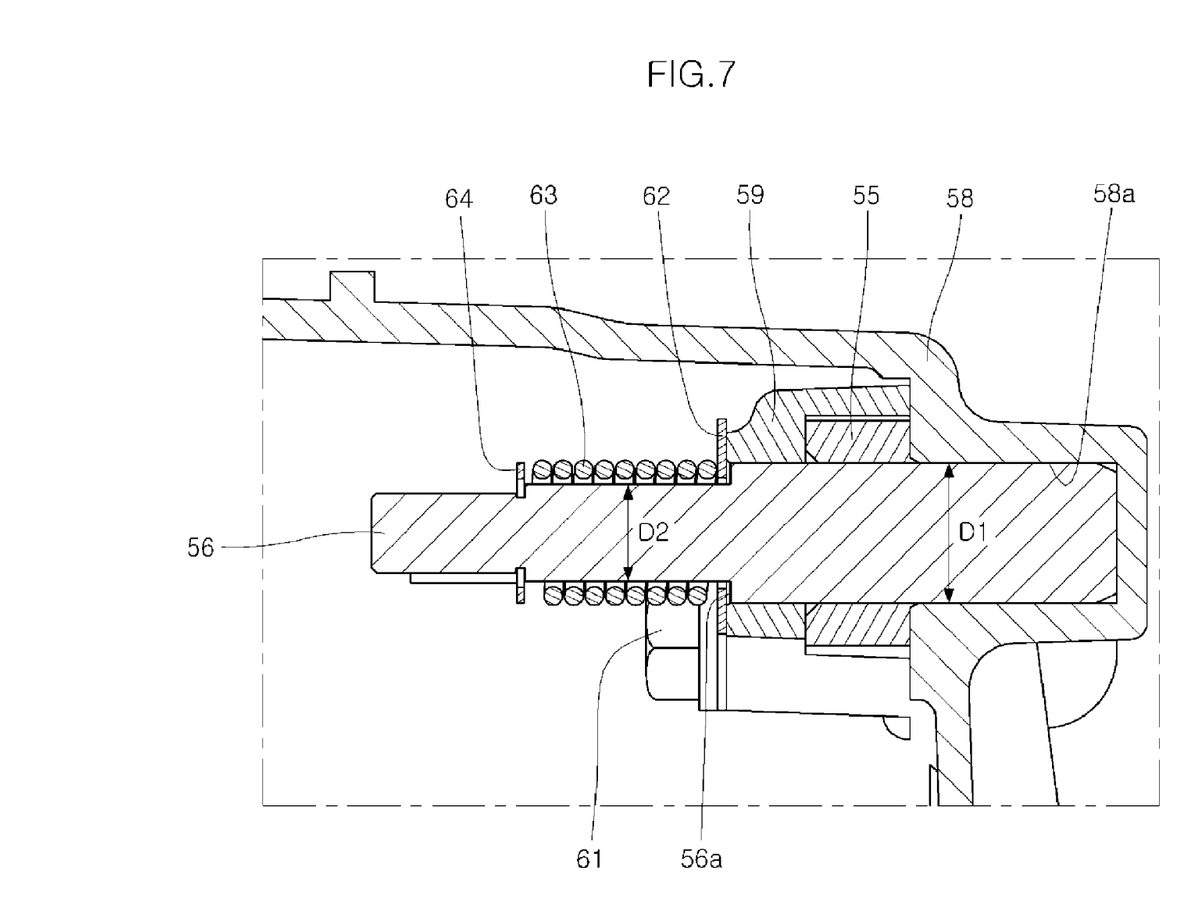
FIG. 7 is a cross-sectional view of FIG. 6.

Because sprag 55 should not come out from sprag shaft 56, a sprag bracket 59 is fitted on sprag shaft 56 to cover sprag 55 and a plurality of bolts 61 is fastened to transmission housing 58 through sprag bracket 59.

Further, because sprag shaft 56 should not come out from shaft groove 58*a*, sprag shaft 56 has a diameter D1 at the portion inserted in sprag shaft 59 which is larger than a diameter D2 at the other portion protruding from sprag shaft 59 and a locking step 56*a* perpendicular to the axis of sprag shaft 56 is formed at the interface of the portions with the different diameters D1 and D2.

Further, a stopper plate 62 is fitted on sprag shaft 56 in close contact to the front surface of sprag bracket 59 to prevent sprag shaft 56 from coming out, and fastened to the front surface of sprag bracket 59 by bolts 61.

Therefore, when sprag shaft 56 moves to come out from shaft groove 58*a*, locking step 56*a* comes in contact to stopper plate 62 and stops sprag shaft 56, such that sprag shaft 56 is prevented from coming out.

Further, a sprag return spring 63 that provides elastic return force to sprag 55 when sprag 55 rotates is wound on the portion protruding through sprag bracket 59 of sprag shaft 56, with one end supported by transmission housing 58 and the other end supported by sprag 55.

Further, because sprag return spring 63 should not come out from sprag shaft 56, a fixing clip 64 that stops sprag return spring 63 is fitted on sprag shaft 56 and sprag return spring 63 is positioned between stopper plate 62 and fixing clip 64.

Therefore, the parking apparatus according to the exemplary embodiments of the present invention does not need to form a housing protrusion in a converter housing, unlike the related art, and can remove the problems due to forming the housing protrusion, because sprag shaft 56 is held by sprag bracket 59 and stopper plate 62.

That is, in related arts, it is difficult to form the housing protrusion because the space in the converter housing is small, and particularly, it is very inconvenient and difficult to adjust the length of the housing protrusion to fit to the length of the portion, which protrudes in transmission housing 58, of sprag shaft 56, such that convenience of work decreases and a large amount of work time is required, thereby decreasing productivity.

However, since the configuration of the present invention does not need to form a housing protrusion in a converter housing to mount sprag shaft 56, unlike the related art, work for forming and machining the housing protrusion is not required, and particularly, the work time decreases, such that convenience of work and productivity are improved.

Further, since the configuration makes it possible to easily and conveniently mount sprag shaft 56, using sprag bracket 59, even if the position, size, and depth of shaft groove 58*a* change in accordance with a change in type of automatic transmissions, the apparatus can be commonly used for all other types of automatic transmissions. Therefore, it is possible to reduce the cost and easily remove interference with other parts, thereby achieving free design.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A parking apparatus for an automatic transmission, comprising:
    a sprag shaft having a first portion and a second portion extending from the first portion, wherein an end of the first portion is inserted in a shaft groove formed in a transmission housing; and
    a sprag having one end fitted around the first portion of the sprag shaft to rotate about the sprag shaft;
    a sprag bracket fitted around the first portion of the sprag shaft to cover the end of the sprag therein, wherein the second portion protrudes through the sprag bracket and the sprag bracket is fixed to the transmission housing; and
    a sprag return spring mounted on the second portion protruding through the sprag bracket, wherein an end of the sprag return spring is supported by the transmission housing and the other end thereof is supported by the sprag.

2. The parking apparatus as defined in claim 1, wherein the first portion of the sprag shaft has a diameter larger than a diameter at the second portion thereof, and
    a locking step substantially perpendicular to a longitudinal axis of the sprag shaft is formed at an interface of the first and second portions of the sprag shaft.

3. The parking apparatus as defined in claim 2, further including a stopper plate that is fitted on the first portion of the sprag shaft in close contact to a front surface of the sprag bracket and fixed to the sprag bracket when the sprag bracket is fixed to the transmission housing, so as to prevent the sprag shaft from being decoupled from the transmission housing by coming in contact with the locking step when the sprag shaft moved to come out from the shaft groove.

4. The parking apparatus as defined in claim 3, further including a fixing clip that is fixed on the second portion of the sprag shaft with a predetermined distance from the stopper plate along the longitudinal axis of the sprag shaft so as to prevent the sprag return spring from being decoupled from the sprag shaft.

5. The parking apparatus as defined in claim 4, wherein the sprag return spring is positioned on the second portion of the sprag shaft between the stopper plate and the fixing clip.

6. The parking apparatus as defined in claim 4, wherein a plurality of fastening members is fastened to the transmission housing, through the stopper plate and the sprag bracket.

\* \* \* \* \*